United States Patent
Schnick

(10) Patent No.: US 7,637,341 B2
(45) Date of Patent: Dec. 29, 2009

(54) APPARATUS FOR PROMOTING TRACTION OF A MOTORCYCLE REAR WHEEL

(76) Inventor: Edward Daniel Schnick, 4200 Winter La., Valparaiso, IN (US) 46385

( * ) Notice: Subject to any disclaimer, the term of this patent is extended or adjusted under 35 U.S.C. 154(b) by 275 days.

(21) Appl. No.: 11/673,718

(22) Filed: Feb. 12, 2007

(65) Prior Publication Data

US 2007/0187165 A1    Aug. 16, 2007

Related U.S. Application Data

(60) Provisional application No. 60/743,272, filed on Feb. 10, 2006.

(51) Int. Cl.
*B62M 7/00* (2006.01)
*B62K 19/36* (2006.01)
(52) U.S. Cl. .................. 180/227; 280/284; 280/285; 280/283
(58) Field of Classification Search .............. 180/227; 280/284, 285, 283
See application file for complete search history.

(56) References Cited

U.S. PATENT DOCUMENTS

| | | | | |
|---|---|---|---|---|
| 4,582,343 A | * | 4/1986 | Waugh | 280/284 |
| 5,909,890 A | * | 6/1999 | Sachs et al. | 280/284 |
| 6,123,165 A | * | 9/2000 | Smith | 180/227 |
| 6,263,994 B1 | * | 7/2001 | Eitel | 180/219 |
| 6,357,546 B1 | * | 3/2002 | Crosby, Jr. | 180/227 |
| 6,543,799 B2 | * | 4/2003 | Miyoshi | 280/283 |
| 7,086,658 B2 | * | 8/2006 | Parigian | 280/284 |
| 7,255,359 B2 | * | 8/2007 | Felsl et al. | 280/279 |
| 7,267,351 B2 | * | 9/2007 | Chamberlain et al. | 280/281.1 |
| 2003/0132602 A1 | * | 7/2003 | Miyoshi | 280/276 |

* cited by examiner

*Primary Examiner*—Lesley D Morris
*Assistant Examiner*—Marlon A Arce
(74) *Attorney, Agent, or Firm*—Hartman & Hartman, P.C.; Gary M. Hartman; Domenica N. S. Hartman

(57) ABSTRACT

An apparatus capable of temporarily limiting travel of the rear suspension system of a motorcycle for the purpose of obtaining better traction when accelerating. The apparatus includes a device having a first base secured to at least one frame member of the motorcycle at a location above a rear suspension member of the motorcycle, and a second base secured to the rear suspension member at a location in proximity to the first base. A post is pivotally mounted to the first base to have first and second positions. In the first position, the post extends toward the second base an engages a retention feature in the second base to prevent movement of the rear suspension member and frame member toward each other. In the second position, the post is disengaged from the retention feature and pivoted away from the second base to permit movement of the rear suspension member and frame member toward each other.

20 Claims, 2 Drawing Sheets

APPARATUS FOR PROMOTING TRACTION OF A MOTORCYCLE REAR WHEEL

CROSS REFERENCE TO RELATED APPLICATIONS

This application claims the benefit of U.S. Provisional Application No. 60/743,272, filed Feb. 10, 2006, the contents of which are incorporated herein by reference.

BACKGROUND OF THE INVENTION

The present invention generally relates to motorcycles, and more particularly to an apparatus capable of temporarily limiting travel of the rear suspension of a motorcycle for the purpose of obtaining better traction when accelerating from a dead stop.

Motocross is a form of racing that involves motorcycles and all-terrain vehicles on off-road courses. Motorcycles used in motocross must be adapted for rough terrain and maneuvering through curves and jumps, and are therefore equipped with engines, transmissions, and suspension systems to maximize their responsiveness and maneuverability. At the start of a motocross race, often termed the "holeshot," riders line up alongside each other and start from a dead stop. The term "holeshot" can also be used to describe the starting performance of a motorcycle, and those motorcycles that are fast off the starting line are said to have a good "holeshot." Because the many turns and rough terrain of a motocross course make passing difficult, the holeshot is often considered to be the most important part of motocross race. For this reason, improvements in the holeshot performance of motocross motorcycles are continuously being sought.

BRIEF SUMMARY OF THE INVENTION

The present invention provides an apparatus capable of temporarily limiting travel of the rear suspension system of a motorcycle for the purpose of obtaining better traction when accelerating from a dead stop.

The apparatus includes a device having a first base adapted for being secured to at least one frame member of the motorcycle frame at a location above a rear suspension member of the motorcycle, and a second base adapted for being secured to the rear suspension member at a location in proximity to the first base. The device further includes a structural member, preferably a post pivotally mounted to the first base so that when the first base is secured to the frame member, the structural member is pivotal between first and second positions. In the first position, the structural member is engaged with the second base to prevent movement of the rear suspension member and the frame member toward each other. In the second position, the structural member is disengaged from the second base to permit movement of the rear suspension member and the frame member toward each other. The structural member is preferably secured to the first base so as to be biased toward the second position.

By preventing movement of the rear suspension member and the frame member toward each other when the structural member is in its first position, the device can function to limit the travel of the motorcycle rear suspension system. In effect, the weight of the motorcycle and its rider are sufficient to maintain the structural member in its first position. Such a capability is advantageous at the start of a motocross race for the purpose of obtaining better traction. As a result of being biased toward its second position, the structural member can be automatically disengaged if sufficient weight is transferred from the rear suspension system of the motorcycle to enable the rear suspension member and frame to move away from each other, such as when the motorcycle becomes airborne or the front brake is applied. Once the structural member is released, the rear suspension system of the motorcycle is able to completely resume its normal operation.

Other objects and advantages of this invention will be better appreciated from the following detailed description.

DETAILED DESCRIPTION OF THE INVENTION

Figure 1:
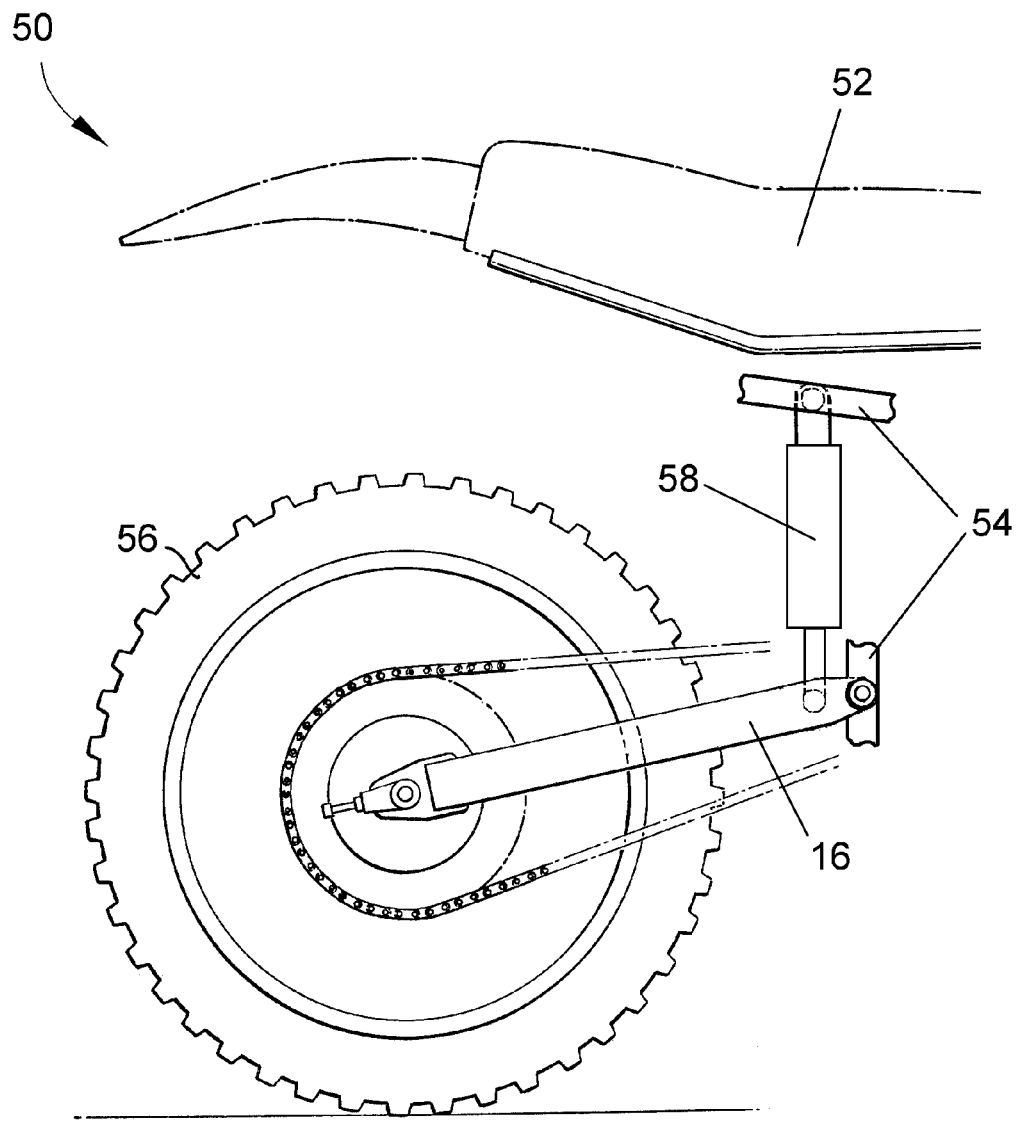
FIG. 1 is a fragmentary side view of the rear end of a motorcycle.

FIG. 1 schematically represents the rear end of a conventional off-road motorcycle 50. The illustrated portion of the motorcycle 50 is generally shown as including a seat 52, portions of a frame 54, and a rear suspension assembly that includes a swing arm 16 pivotally coupled to the frame 54, a rear wheel 56 mounted at the free rearward end of the swing arm 16, and a shock absorber 58 that couples the swing arm 16 to the frame 54. While only a single arm of the swing arm 16 is seen in FIG. 1, swing arms typically comprise two arms that define a fork between which the rear tire 56 would be mounted. As a matter of convenience, other conventional components of the motorcycle 50 are not shown but nonetheless well known. The construction and function of those components of the motorcycle 50 shown and not shown in FIG. 1 are within the knowledge and skill of those in the art, and therefore will not be discussed in any detail below.

Due to the performance requirements of off-road motorcycles of the type represented in FIG. 1, the rear suspension system of the motorcycle 50 is rugged and cushions the rider from jarring impacts and maneuvers to which the rear tire 56 is subjected when the motorcycle 50 hits bumps and holes, makes quick turns and jumps, etc. The combination of placing the rear tire 56 at the free end of the swing arm 16 and connecting the swing arm 16 to the motorcycle frame 54 through the shock absorber 58 assists in this important function. While the shock absorber 58 is represented as a single cylinder, additional cylinders and/or other shock-absorbing mechanisms could be employed. Furthermore, though the lower end of the shock absorber 58 is shown as being directly attached to the swing arm 16, various techniques are known for connecting the shock absorber 58 to the swing arm 16, such as through one or more linkages in order to obtain a desired level of shock absorption. In any event, the shock absorber 58 is intended to resist and damp the upward travel of the swing arm 16 toward the frame 54. Consequently, the shock absorber 58 biases the free end of the swing arm 16 away from the motorcycle frame 54.

Figure 2:
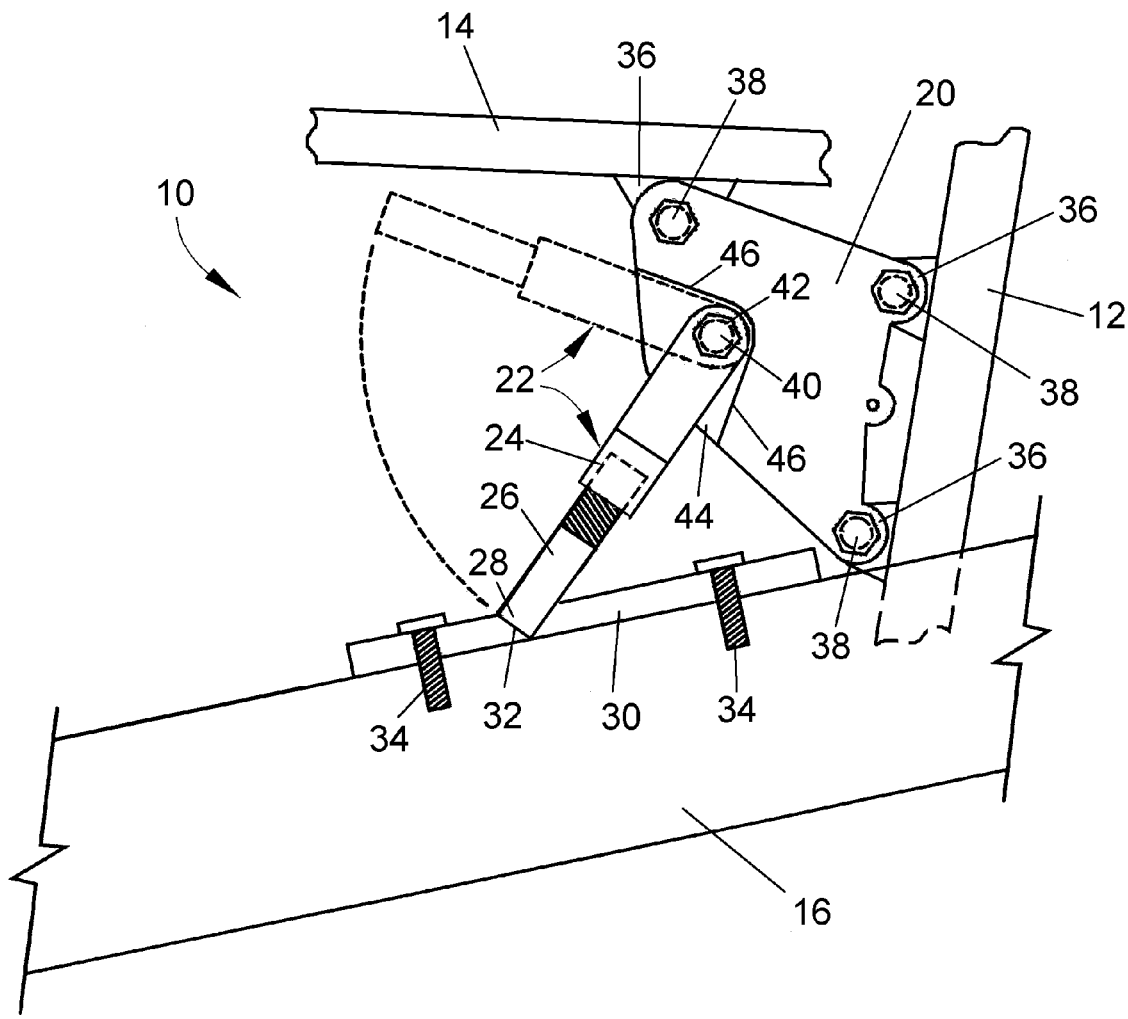
FIG. 2 represents a side view of a device for temporarily limiting the travel of the rear suspension system of the motorcycle of FIG. 1 in accordance with a preferred embodiment of this invention.

FIG. 2 schematically represents a device 10 that, in combination with the swing arm 16 and shock absorber 58, provides a traction control apparatus for the rear wheel 56 of the motorcycle 50. Unlike launch control devices that have been employed at the front forks of motorcycles, the device 10 is located on the motorcycle 50 rearward of where the swing arm 16 is pivotally connected to the motorcycle frame.

The device 10 is represented in FIG. 2 as including upper and lower plates 20 and 30. The plates 20 and 30 are represented as having generally planar shapes, though other shapes are foreseeable. The upper plate 20 is generally oriented in a vertical plane that is parallel to the longitudinal axis of the motorcycle 50, and secured to members 12 and 14 of the motorcycle frame 54 immediately above the swing arm 16. The upper plate 20 is shown as being secured to tabs 36 on the frame members 12 and 14 with bolts 38, though other fastening techniques are foreseeable and could be used. With some motorcycle frame configurations, the lower frame member 12 may be a portion of the frame 54 to which the swing arm 16 or shock absorber 58 is attached, while the upper frame member 14 may be a portion of the frame 54 to which the exhaust pipe (not shown) of the motorcycle 50 is secured. With the orientation and placement shown in FIG. 2, the upper plate 20 is firmly and reliably prevented from being moved upward and in a forward direction of the motorcycle 50. The lower plate 30 is shown as being directly mounted to an upper surface of the swing arm 16 with a pair of bolts 34, though again other fastening techniques are foreseeable and could be used. The lower plate 30 has an upper surface in which a recess 32 is defined as a detent or retention feature, as explained below.

A post assembly 22 is shown as being pivotally mounted with a bolt 40 to a recessed portion 44 of the upper plate 20. The recessed portion 44 defines two shoulders 46 that limit the extent to which the post assembly 22 is able to pivot. The lower travel extent of the post assembly 22 is shown as resulting in the post assembly 22 extending downwardly and rearwardly toward the swing arm 16. The upper travel extent of the post assembly 22 is shown in phantom, and results in the post assembly 22 extending rearwardly but upwardly away from the swing arm 16. The post assembly 22 is preferably biased toward its upper travel extent, such as with a torsion spring 42 associated with the bolt 40, though other means for biasing the post assembly 22 away from the swing arm 16 are also possible and within the scope of this invention. The post assembly 22 is depicted as comprising an upper rod 24 and a lower rod 26 threaded into a threaded bore formed in the upper rod 24. The distal end 28 of the lower rod 26 is shown engaged in the recess 32 of the lower plate 30, which effectively prevents the swing arm 16 from traveling any farther toward the frame members 12 and 14, and conversely, prevents the frame 54 of the motorcycle 50 from traveling any farther in the downward direction. The rear suspension system of the motorcycle 50 is effectively locked at this point, with no further suspension travel possible. In contrast, when the post assembly 22 is pivoted upward out of engagement with the recess 32, the swing arm 16 is able to travel farther toward the frame 54 and its frame members 12 and 14, restricted only by the shock absorber 58. Because the shock absorber 58 urges the swing arm 16 away from the frame 54, the length of the post assembly 22 is preferably adjusted so that the weight of the rider on the seat 52 is sufficient to hold the distal end 28 of the post assembly 22 within the recess 32 of the lower plate 30, but also so that the distal end 28 will escape the recess 22 if sufficient weight is transferred off the shock absorber 58 or the swing arm 16 is able to freely pivot downward. The former condition may occur if the rider sufficiently shifts his or her weight forward, or during hard braking such as often must be performed when entering the first turn of a motocross course. The latter condition may occur during a jump, when the rear tire 56 leaves the ground.

In view of the above, when a rider takes off from a standing start, such as at the beginning of a motocross race, the device 10 can be employed to greatly limit the rear suspension travel, which advantageously provides additional traction prevents while also preventing or at least greatly reducing the risk of performing a wheelie during a rapid acceleration. Thereafter, when the brakes of the motorcycle 50 are applied or the motorcycle 50 leaves the ground, the swing arm 22 pivots sufficiently downward to enable the spring-loaded post assembly 22 to be released from the recess 32, thereby completely restoring the full suspension travel of the motorcycle 50 for the rest of the race.

While the invention has been described in terms of a preferred embodiment, it is apparent that other forms could be adopted by one skilled in the art. For example, various other physical configurations could be used to provide a member that temporarily limits downward travel of a motorcycle frame relative to the motorcycle rear tire mounted on a rear suspension, yet moves out of the way when the frame travels upward relative to the rear suspension. Therefore, the scope of the invention is to be limited only by the following claims.

The invention claimed is:

1. An apparatus for temporarily limiting travel of a rear suspension member of a motorcycle relative to a frame of the motorcycle, the apparatus including a device comprising:
   a first base;
   means for securing the first base to at least one frame member of the frame at a location above the rear suspension member;
   a second base adapted to be mounted on the rear suspension member at a location in proximity to the first base;
   a structure between the first and second bases and coupled to one of the first and second bases, the structure having a first position in which the structure is operable with the first and second bases to temporarily limit downward travel of the frame relative to the rear suspension member, the structure being movable to a second position in which the structure permits downward travel of the frame relative to the rear suspension member; and
   means for biasing the structure toward the second position thereof;
   wherein the structure is adapted to move from the first position to the second position in response to the first and second bases moving apart from each other.

2. The apparatus according to claim 1, wherein the structure is a post pivotally mounted to the first base so that when the first base is secured to the frame member with the securing means, the post is pivotal between the first position in which the post extends toward the second base and a distal end of the post is engaged with the second base to prevent movement of the rear suspension member and the frame member toward each other, and the second position in which the distal end of the post is disengaged and pivoted away from the second base to permit movement of the rear suspension member and the frame member toward each other.

3. The apparatus according to claim 2, wherein the post is pivotally mounted to the first base so that the post extends in a rearward direction of the motorcycle when in the first position.

4. The apparatus according to claim 2, wherein the post is pivotally mounted to the first base so that the post extends in rearward directions of the motorcycle when in the first and second positions.

5. The apparatus according to claim 1, wherein the first base comprises a plate and the means for securing the first base are operable to prevent movement of the plate in a forward direction of the motorcycle and an upward direction.

6. The apparatus according to claim 1, wherein the biasing means is a torsion spring.

7. An apparatus for temporarily limiting travel of a rear suspension member of a motorcycle relative to a frame of the motorcycle, the apparatus including a device comprising:
   a first base;

means for securing the first base to at least one frame member of the frame at a location above the rear suspension member;

a second base adapted to be mounted on the rear suspension member at a location in proximity to the first base;

a structure between the first and second bases and coupled to one of the first and second bases, the structure having a first position in which the structure is operable with the first and second bases to temporarily limit downward travel of the frame relative to the rear suspension member, the structure being movable to a second position in response to the frame traveling upward relative to the rear suspension member wherein the structure permits downward travel of the frame relative to the rear suspension member;

means for biasing the structure toward the second position thereof; and means for adjusting the length of the structure.

8. The apparatus according to claim 7, wherein the adjusting means comprises a first member of the structure and a second member of the structure threaded into the first member.

9. The apparatus according to claim 1, wherein the second base comprises a retention feature engageable by the structure when in the first position.

10. The apparatus according to claim 1, wherein the rear suspension member is a swing arm pivotally secured to the frame at a point forward of the device.

11. The apparatus according to claim 1, wherein the device is installed on the motorcycle.

12. A motorcycle comprising a frame, a rear suspension member disposed below the frame, means for urging the frame and the rear suspension member apart, and an apparatus for temporarily limiting movement of the rear suspension member and the frame toward each other, the apparatus including a device comprising:

a first base;

means for securing the first base to at least one frame member of the frame at a location above the rear suspension member;

a second base on the rear suspension member at a location in proximity to the first base and having a retention feature facing the first base;

a post pivotally mounted to the first base so that when the first base is secured to the frame member with the securing means, the post is pivotal between a first position in which the post extends toward the second base and a distal end of the post is engaged with the retention feature in the second base to prevent movement of the rear suspension member and the frame member toward each other, and a second position in which the distal end of the post is disengaged from the retention feature and pivoted away from the second base to permit movement of the rear suspension member and the frame member toward each other; and means for biasing the post toward the second position thereof.

13. The motorcycle according to claim 12, wherein the post is pivotally mounted to the first base so that the post extends in a rearward direction of the motorcycle when in the first position.

14. The motorcycle according to claim 12, wherein the post is pivotally mounted to the first base so that the post extends in a rearward direction of the motorcycle when in the second position.

15. The motorcycle according to claim 12, wherein the post is pivotally mounted to the first base so that the post extends in rearward directions of the motorcycle when in the first and second positions.

16. The motorcycle according to claim 15, wherein the first base comprises a plate and the means for securing the first base are operable to prevent movement of the plate in a forward direction of the motorcycle and an upward direction.

17. The motorcycle according to claim 12, wherein the biasing means is a torsion spring.

18. The motorcycle according to claim 12, further comprising means for adjusting the length of the post.

19. The apparatus according to claim 18, wherein the adjusting means comprises a first member of the post and a second member of the post threaded into the first member.

20. The motorcycle according to claim 12, wherein the rear suspension member is a swing arm pivotally secured to the frame at a point forward of the device.

* * * * *